United States Patent [19]

Anguita

[11] Patent Number: 4,605,000
[45] Date of Patent: Aug. 12, 1986

[54] GREENHOUSE HELMET

[76] Inventor: Waldemar Anguita, 83 N. Henry St., Apt. 1-L, Brooklyn, N.Y. 11222

[21] Appl. No.: 688,821

[22] Filed: Jan. 4, 1985

[51] Int. Cl.⁴ ............................................. A62B 7/00
[52] U.S. Cl. .................................. 128/201.25; 2/424; 2/205; 2/171.2; D29/9; D2/322; 446/27
[58] Field of Search ................ 2/209.1, 410, 424, 205, 2/171.2; 128/201.23, 201.22, 201.25, 201.19, 201.26, 201.29; D29/9; D2/322, 323; 446/27

[56] References Cited

U.S. PATENT DOCUMENTS 737,373  8/1903  Eagle et al. ..................... 128/201.23
2,888,011  5/1959  Penrod et al. .................. 128/201.23

FOREIGN PATENT DOCUMENTS 348733  5/1937  Italy ............................... 128/201.25
42409  1/1908  Switzerland .................... 128/201.19
442224  2/1936  United Kingdom ........... 128/201.19

Primary Examiner—Henry J. Recla
Attorney, Agent, or Firm—Richard L. Miller

[57] ABSTRACT

A greenhouse helmet is provided and consists of a dome containing plants secured within the dome worn completely over the head of a person so that the person can breathe in the oxygen given off by the plants.

6 Claims, 3 Drawing Figures

GREENHOUSE HELMET

BACKGROUND OF THE INVENTION

The instant invention relates generally to enclosure devices and more specifically it relates to a greenhouse helmet that incorporates small plants into a sealed helmet to be worn over the head of a person.

Numerous enclosure devices have been provided in prior art. For example U.S. Pat. Nos. 3,903,642 and 3,995,396 are terrariums adapted to just hold plants and not designed to be worn over the head of a person, while U.S. Pat. No. 4,331,141 contains a variety of devices for protection of organs of respiration that are worn to cover the nose and mouth of a person but are not designed to contain plants within.

SUMMARY OF THE INVENTION

A principle object of the present invention is to provide a greenhouse helmet designed to contain plants secured within and the helmet worn completely over the head of a person so that the person can breathe in the oxygen given off by the plants.

Another object is to provide a greenhouse helmet that has air filters so that ambient air containing carbon dioxide will be filtered therethrough and mixed with the carbon dioxide breathed out by the person to be used by the plants.

An additional object is to provide a greenhouse helmet that will contain hearing and speaking devices so that the person can hear within and speak out through the helmet.

A further object is to provide a greenhouse helmet that is economical in cost to manufacture.

A still further object is to provide a greenhouse helmet that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figures 1, 2, 3:
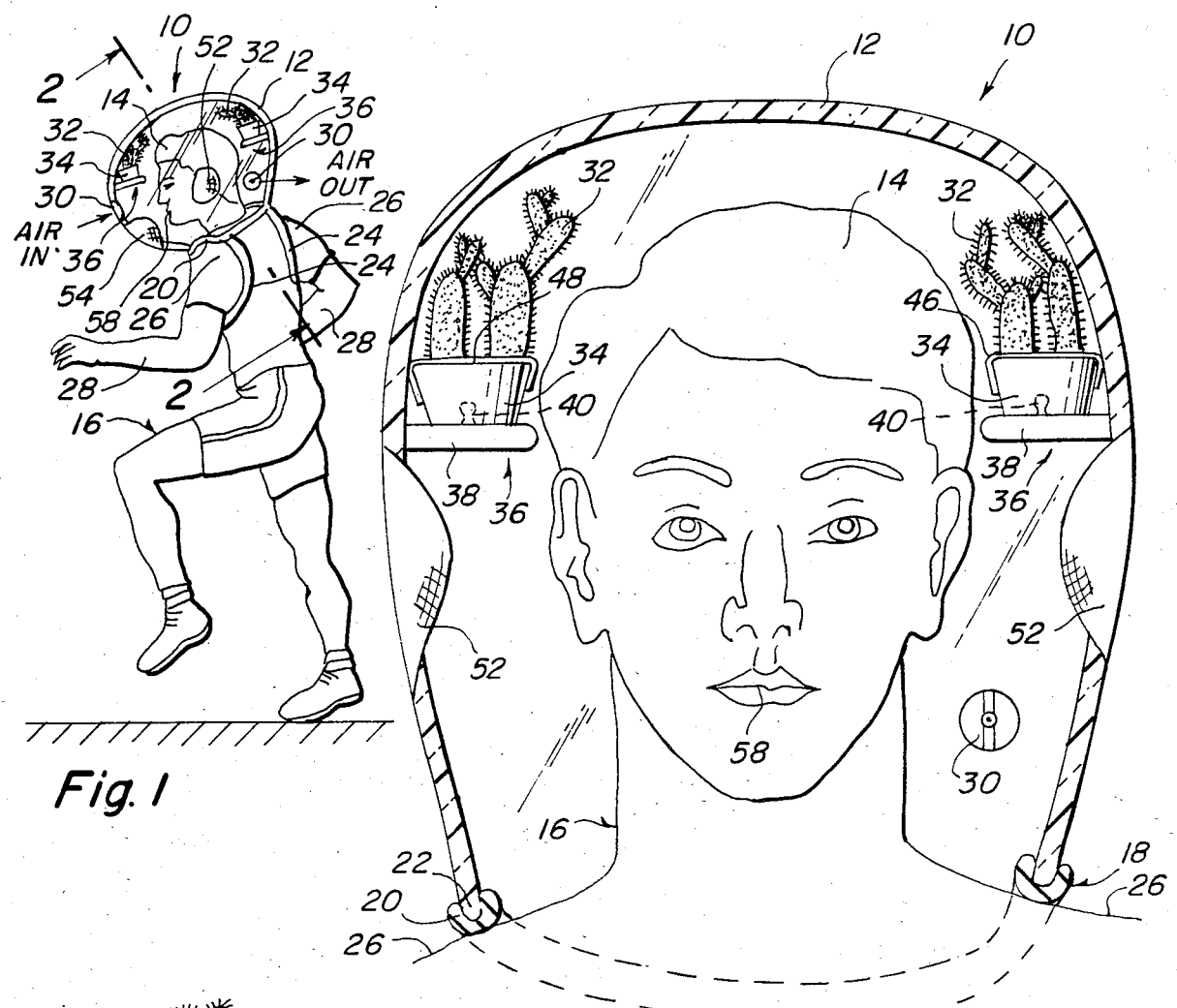
FIG. 1 is a side view of the invention in use on a person.
FIG. 2 is an enlarged cross sectional view taken along line 2—2 in FIG. 1.
FIG. 3 is still further enlarged partially exploded front view with parts broken away of one of the shelves and potted plants.

Turning now descriptively to the drawings, in which similar reference characters denote similar elements throughout the several views, FIGS. 1 through 3 illustrates a greenhouse helmet 10 that has a transparent dome 12 worn completely over a head 14 of a person 16. The dome 12 is fabricated from anti-fog material so that the person 16 can see therethrough.

A device 18 for securing the dome 12 to the person 16 has insulation 20 formed around lip 22 of the dome to seal the dome around the head 14 of the person. A pair of straps 24, 24 are affixed to the lip 22 of the dome extending around shoulders 26, 26 and arms 28, 28 of the person 16.

A pair of air filters 30, 30 are for adequately filtering ambient air that has carbon dioxide in and out of the dome 12. One filter 30 is mounted within front of the dome allowing the ambient air in and the other filter 30 is mounted within rear of the dome allowing the air breathed by the person 16 out.

Plants 32, each within a pot 34 are placed within the dome 12. The carbon dioxide of the ambient air will mix with carbon dioxide breathed out by the person 16 to be used by the plants 32 to produce oxygen to be breathed in by the person 16.

A device 36 as best shown in FIG. 3 is for securing the plant 32 and pot 34 with the dome 12. The device 36 is a shelf 38 that has a snap-on male member 40 affixed to top thereon. The shelf 38 is transversely affixed within the dome. The pot 34 has a female socket 42 formed within bottom 44 thereof so that the female socket 42 can snap on the male member 40. A cloth 46 covers top 48 of the pot 34 allowing the plant 32 to extend upwards therefrom while keeping dirt 50 within the pot 34.

A pair of hearing devices 52, 52 and an audio device 54 are also provided. Each hearing device 52 is mounted to a side of the dome 12 adjacent an ear 56 of the person 16 so that the person can hear within the dome.

The audio device 54 is mounted to front of the dome 12 adjacent mouth 58 of the person 16 so that the person can speak out through the dome.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A greenhouse helmet which comprises:
    (a) a transparent dome worn completely over the head of a person;
    (b) means for securing said dome to said person;
    (c) means for adequately filtering ambient air having carbon dioxide in and out of said dome to meet the needs of the person;
    (d) means for resting at least one plant within a pot placed in said dome so that carbon dioxide of said ambient air will mix with carbon dioxide breathed out by said person to be used by said plant to produce oxygen to be breathed in by said person in addition to the ambient air; and
    (e) means for securing said plant and pot upon said resting means within said dome.

2. A greenhouse helmet as recited in claim 1, wherein said dome is fabricated from anti-fog material so that said person can see therethrough.

3. A greenhouse helmet as recited in claim 2 wherein said means for securing said dome to said person includes:
    (a) insulation formed around lip of said dome to seal dome around said head of person; and (b) a pair of straps affixed to said lip of said dome extending around shoulders and arms of said person.

4. A greenhouse helmet as recited in claim 3 wherein said filtering means includes a pair of air filters, one said filter mounted within front of said dome allowing said ambient air in and other said filter mounted within rear of said dome allowing said air breathed by said person out.

5. A greenhouse helmet as recited in claim 4 wherein said means for securing said plant includes:
(a) a shelf having a snap-on male member affixed to top thereon, said shelf transversely affixed within said dome;
(b) said pot having a female socket formed within bottom thereof so that said female socket can snap on said male member; and
(c) a cloth to cover top of said pot allowing said plant to extend upwards therefrom while keeping dirt within said pot.

6. A greenhouse helmet as recited in claim 5 further comprising:
(a) a pair of hearing devices each said hearing device mounted to a side of said dome adjacent an ear of said person so that said person can hear within said dome; and
(b) an audio device mounted to front of said dome adjacent mouth of said person so that said person can speak out through said dome.

* * * * *